(12) United States Patent
Steinberg et al.

(10) Patent No.: US 7,318,098 B2
(45) Date of Patent: Jan. 8, 2008

(54) METHOD AND SYSTEM FOR SHORT MESSAGE SERVICE (SMS) TRANSACTIONS FOR WIRELESS DEVICES

(75) Inventors: David A. Steinberg, Washington, DC (US); Kenneth D. Landry, Apex, NC (US); Mark T. Miller, Durham, NC (US)

(73) Assignee: InPhonic, Inc., Washington, DC (US)

( * ) Notice: Subject to any disclaimer, the term of this patent is extended or adjusted under 35 U.S.C. 154(b) by 942 days.

(21) Appl. No.: 10/420,074

(22) Filed: Apr. 22, 2003

(65) Prior Publication Data

US 2004/0006538 A1 Jan. 8, 2004

Related U.S. Application Data

(60) Provisional application No. 60/374,430, filed on Apr. 22, 2002.

(51) Int. Cl.
*G06F 15/16* (2006.01)
*H04Q 7/20* (2006.01)

(52) U.S. Cl. .................... 709/227; 455/466
(58) Field of Classification Search ............. 709/227, 709/246; 455/466
See application file for complete search history.

(56) References Cited

U.S. PATENT DOCUMENTS

| | | | |
|---|---|---|---|
| 5,325,419 A | 6/1994 | Connolly | |
| 5,353,331 A | 10/1994 | Emery et al. | |
| 5,479,411 A | 12/1995 | Klein | |
| 5,506,887 A | 4/1996 | Emery et al. | |
| 5,557,664 A | 9/1996 | Burns | |
| 5,579,379 A | 11/1996 | D'Amico et al. | |
| 5,594,740 A | 1/1997 | LaDue | |
| 5,604,788 A | 2/1997 | Tett | |
| 5,625,669 A | 4/1997 | McGregor et al. | |
| 5,633,919 A | 5/1997 | Hogan et al. | |
| 5,635,918 A | 6/1997 | Tett | |
| 5,724,407 A | 3/1998 | Bruno et al. | |
| 5,742,668 A | 4/1998 | Pepe et al. | |
| 5,742,905 A | 4/1998 | Pepe et al. | |
| 5,758,088 A | 5/1998 | Bezaire et al. | |
| 5,845,203 A | 12/1998 | LaDue | |
| 5,867,566 A | 2/1999 | Hogan et al. | |
| 5,872,926 A | 2/1999 | Levac et al. | |
| 5,951,638 A | 9/1999 | Hoss et al. | |
| 5,959,543 A | 9/1999 | LaPorta et al. | |
| 5,987,100 A | 11/1999 | Portman et al. | |
| 6,002,750 A | 12/1999 | Ertz | |

(Continued)

FOREIGN PATENT DOCUMENTS

| | | |
|---|---|---|
| WO | WO 01/82582 | 11/2001 |
| WO | WO 02/11422 | 2/2002 |

*Primary Examiner*—Larry D. Donaghue
(74) *Attorney, Agent, or Firm*—Patton Boggs LLP

(57) ABSTRACT

A short message transaction system has a computer that communicates in an online Internet protocol that forms active sessions. A wireless device communicates in a protocol that transmits and receives messages that have a maximum size limit of a predetermined number of alphanumeric characters substantially smaller than the number of alphanumeric characters transmitted in a communication of the computer. A database is also provided. A surrogate communicates with the wireless device and the computer. The surrogate collects data from a plurality of messages from the wireless device and provides the data for storage in the database. The computer then runs online sessions using the stored data.

14 Claims, 10 Drawing Sheets

U.S. PATENT DOCUMENTS

| | | | |
|---|---|---|---|
| 6,061,718 A | 5/2000 | Nelson | |
| 6,072,862 A | 6/2000 | Srinivasan | |
| 6,073,029 A | 6/2000 | Smith et al. | |
| 6,178,331 B1 | 1/2001 | Holmes et al. | |
| 6,185,545 B1 | 2/2001 | Resnick et al. | |
| 6,203,192 B1 | 3/2001 | Fortman | |
| 6,212,506 B1 | 4/2001 | Shah et al. | |
| 6,237,041 B1 | 5/2001 | Haal et al. | |
| 6,240,296 B1 | 5/2001 | Yu et al. | |
| 6,249,808 B1 | 6/2001 | Seshadri | |
| 6,259,791 B1 | 7/2001 | Moore | |
| 6,282,276 B1 | 8/2001 | Felger | |
| 6,301,245 B1 | 10/2001 | Luzeski et al. | |
| 6,304,564 B1 | 10/2001 | Monin et al. | |
| 6,332,085 B1 | 12/2001 | Hanson et al. | |
| 6,333,973 B1 | 12/2001 | Smith et al. | |
| 6,335,927 B1 | 1/2002 | Elliott et al. | |
| 6,335,963 B1 | 1/2002 | Bosco | |
| 6,347,340 B1 | 2/2002 | Coelho et al. | |
| 6,349,135 B2 | 2/2002 | Frazier et al. | |
| 6,397,055 B1 | 5/2002 | McHenry et al. | |
| 6,421,707 B1 | 7/2002 | Miller et al. | |
| 6,424,706 B1 | 7/2002 | Katz et al. | |
| 6,539,082 B1 | 3/2003 | Lowe | |
| 6,553,108 B1 | 4/2003 | Felger | |
| 6,665,711 B1 * | 12/2003 | Boyle et al. | 709/219 |
| 6,909,904 B2 * | 6/2005 | Lehto et al. | 455/466 |
| 6,920,331 B1 * | 7/2005 | Sim et al. | 455/466 |
| 7,050,408 B2 * | 5/2006 | Shen et al. | 370/329 |
| 7,054,903 B2 * | 5/2006 | Kadyk et al. | 709/203 |
| 2001/0056508 A1 * | 12/2001 | Ameson et al. | 709/318 |
| 2002/0032641 A1 * | 3/2002 | Mendiola et al. | 705/37 |
| 2003/0073440 A1 * | 4/2003 | Mukherjee et al. | 455/435 |
| 2003/0163580 A1 * | 8/2003 | Lee | 709/230 |

\* cited by examiner

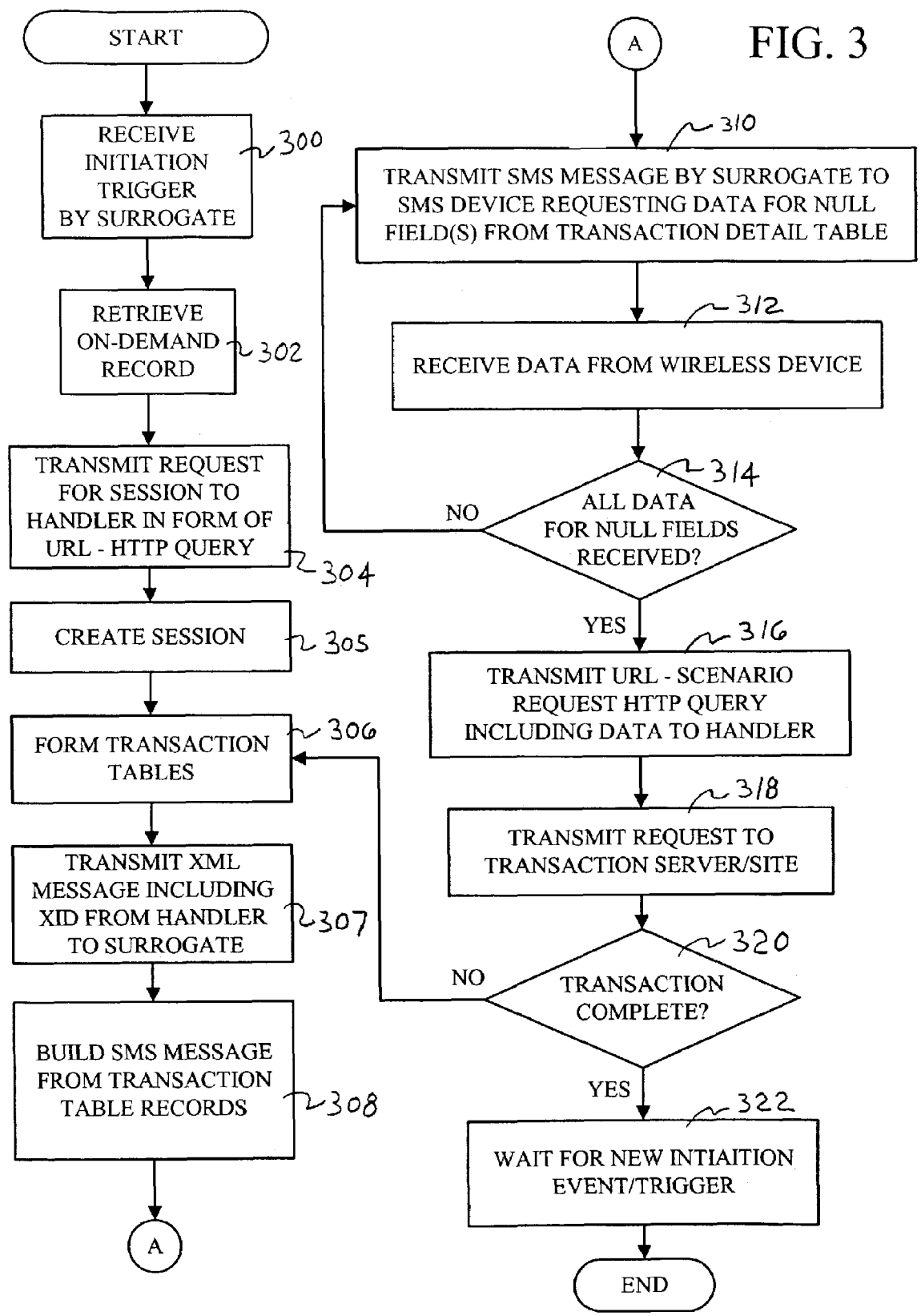

FIG. 5A
OnDemand Table ~500

| Request | RequestID | URL | ScenarioName | StartPage | UserIDRequired | AutoLogin |
|---|---|---|---|---|---|---|
| Tasks | 1 | /ipmg/RS7 | TaskList | Start | yes | no |
| Email | 2 | /ipmg/RS7 | Email | Inbox | yes | no |
| Rebid | 3 | /ipmg/RS7 | Rebid | Outbid | yes | yes |

FIG. 5B
OnDemandDetails Table

| RequestID | NAME | VALUE | TYPE | ~502 |
|---|---|---|---|---|
| 3 | GSUN | null | input | |
| 3 | GSPW | null | input | |
| 3 | AuctionID | null | input | |

FIG. 5C
Transactions Table ~504

| XID | UserID | SUBJECT | BODY | URL | SESSIONID |
|---|---|---|---|---|---|
| 12345 | 134 | Task List Login | Login | /ipmg/RS7 | Jsessionid=6D128573i |

FIG. 5D
TransactionsDetail Table ~506

| XID | ENUM | PROMPT | NAME | VALUE | TYPE |
|---|---|---|---|---|---|
| 12345 | Null | Username: | GSUN | null | input |
| 12345 | Null | PIN: | GSPW | null | input |
| 12345 | Null | null | GSsid | 7 | hidden |
| 12345 | Null | null | GSpn | Done | hidden |
| 12345 | Null | null | Button | OK | submit |

FIG. 5E

Transactions Table ~508

| XID | UserID | SUBJECT | BODY | URL | SESSIONID |
|---|---|---|---|---|---|
| 12346 | 134 | Task List | You have 4 new work items | /ipmg/RS7 | Jsessionid=6D128573i |

FIG. 5F

TransactionsDetail Table ~510

| XID | ENUM | PROMPT | NAME | VALUE | TYPE |
|---|---|---|---|---|---|
| 12346 | 1 | Accept Task | Display | 0 | get |
| 12346 | 1 | null | GSpn | OpenTasks | get |
| 12346 | 2 | Close Task | Display | 1 | get |
| 12346 | 2 | null | GSpn | CloseTasks | get |
| 12346 | Null | null | GSsid | 7 | get |
| 12346 | Null | null | GSps | SummarySvc | get |

FIG. 5G

Transactions Table ~512

| XID | UserID | SUBJECT | BODY | URL | SESSIONID |
|---|---|---|---|---|---|
| 12347 | 134 | Auction Rebid | Your are now the high bidder on item #1234 | null | Jsessionid=6D128573i |

FIG. 5H

TransactionsDetail Table ~514

| XID | ENUM | PROMPT | NAME | VALUE | TYPE |
|---|---|---|---|---|---|

(empty)

METHOD AND SYSTEM FOR SHORT MESSAGE SERVICE (SMS) TRANSACTIONS FOR WIRELESS DEVICES

RELATED APPLICATION

Priority for this application is based on U.S. provisional application 60/374,430 filed on Apr. 22, 2002.

TECHNICAL FIELD

The present invention relates generally to a system for electronic financial negotiations and transactions on networks with wireless communication devices such as cellular telephones connected to a computer network, and more particularly to a SMS transaction system for participating in internet-based transactions with SMS messages from wireless telephones.

BACKGROUND OF THE INVENTION

Internet web-sites, such as eBay, are known to hold online electronic auctions. To participate in these auctions, typically, a computer terminal with a modem is used to call an Internet service provider to have the computer linked to the Internet as is well known. This permits the user's computer to download information from other computers linked to the Internet including web pages and auction options provided by the auctioneer's computer. The user or bidder links to the auction web site, registers to be a purchaser/bidder, views objects or products for sale and submits bids, via the web browser and web navigator, to the auction website or auction server. The bidder can then periodically monitor the auction web site to see if his bid was the final high bid and enter a new bid.

For users who do not have web enabled wireless devices, nothing is provided for the user to monitor the auction through the wireless device in real time just like being online. This is true even if the user has a display that displays text on the phone and typically is compatible with SMS (short message service) messaging. Wireless devices that receive SMS are not "online" in the sense that they cannot directly download and read web pages (e.g. XML, WAP (Web Access Protocol), WML, HTML). Instead, an SMS center receives SMS messages (or receives emails and converts the emails into SMS messages) where they are stored until the wireless device receives the message. A receipt can then be transmitted from the SMS center that the message was received. This process is very slow compared to being online and does not allow the SMS device to monitor the online transaction.

In addition, with conventional services, e-mail can be received on Internet or e-mail enabled (web or WAP enabled) devices such as a PDA or WAP enabled cellular telephones. However, these systems only provide the ability to monitor the auction. In other words, the user will only receive a message to report the latest bid or whether or not they still have the highest bid, but no way exists for the user to immediately enter a new bid on the wireless device when, for example, the user is informed that he has been outbid. For SMS wireless devices, no way exists to immediately respond to a message via the Internet to, for example, quickly place a new bid in an online auction. A response must be performed separately or in a "disjointed" way such as by voice or separate computer/device with email or Internet capabilities.

BRIEF SUMMARY OF THE INVENTION

In one aspect of the invention, it is possible to transact with an online electronic transaction server, such as a web site offering products for sale or an auction site, with an SMS wireless device. This is possible by providing a two-part computer or network system where one part (the mobile application) communicates online in active sessions with the transaction server and needs all data for a transaction ready at hand in short-term memory and another part (the surrogate) that can communicate with SMS or other wireless devices that communicate in messages of very short length or bandwidth (very low alpha-numeric character limitation). This second part or surrogate can wait for replies to its messages, and can collect data "step-wise" for a single transaction over a number of these short messages. Once all data is collected, the data is provided to the mobile application to perform an online transaction on behalf of the user of the wireless device. Since the transaction does not occur until the surrogate collects all the necessary data, the online transaction is not adversely affected by the amount of time it takes a user to reply to a request for data by the surrogate.

More specifically, a short message transaction system has a computer that communicates in an online Internet protocol that forms active sessions. A wireless device communicates in a protocol that transmits and receives messages that have a maximum size limit of a predetermined number of alpha-numeric characters substantially smaller than the number of alphanumeric characters transmitted in a communication of the computer. A database is also provided. A surrogate communicates with the wireless device and the computer. The surrogate collects data from a plurality of messages from the wireless device and provides the data for storage in the database. The computer then runs online sessions using the stored data.

In another aspect of the invention, the computer also has a handler for receiving the data from the surrogate and for storing and manipulating data in the database.

BRIEF DESCRIPTION OF THE SEVERAL VIEWS OF THE DRAWINGS

The above mentioned and other features of the invention and the manner of obtaining them will be apparent, and the invention itself will be best understood by reference to the following detailed description of the preferred embodiment of the invention in conjunction with the drawings, in which:

FIG. 3 is a simplified flow chart showing the general method of operating the system of the present invention;

FIGS. 5A-5H are tables showing data recorded on a database in accordance with the present invention.

DETAILED DESCRIPTION OF THE INVENTION

Figure 1:
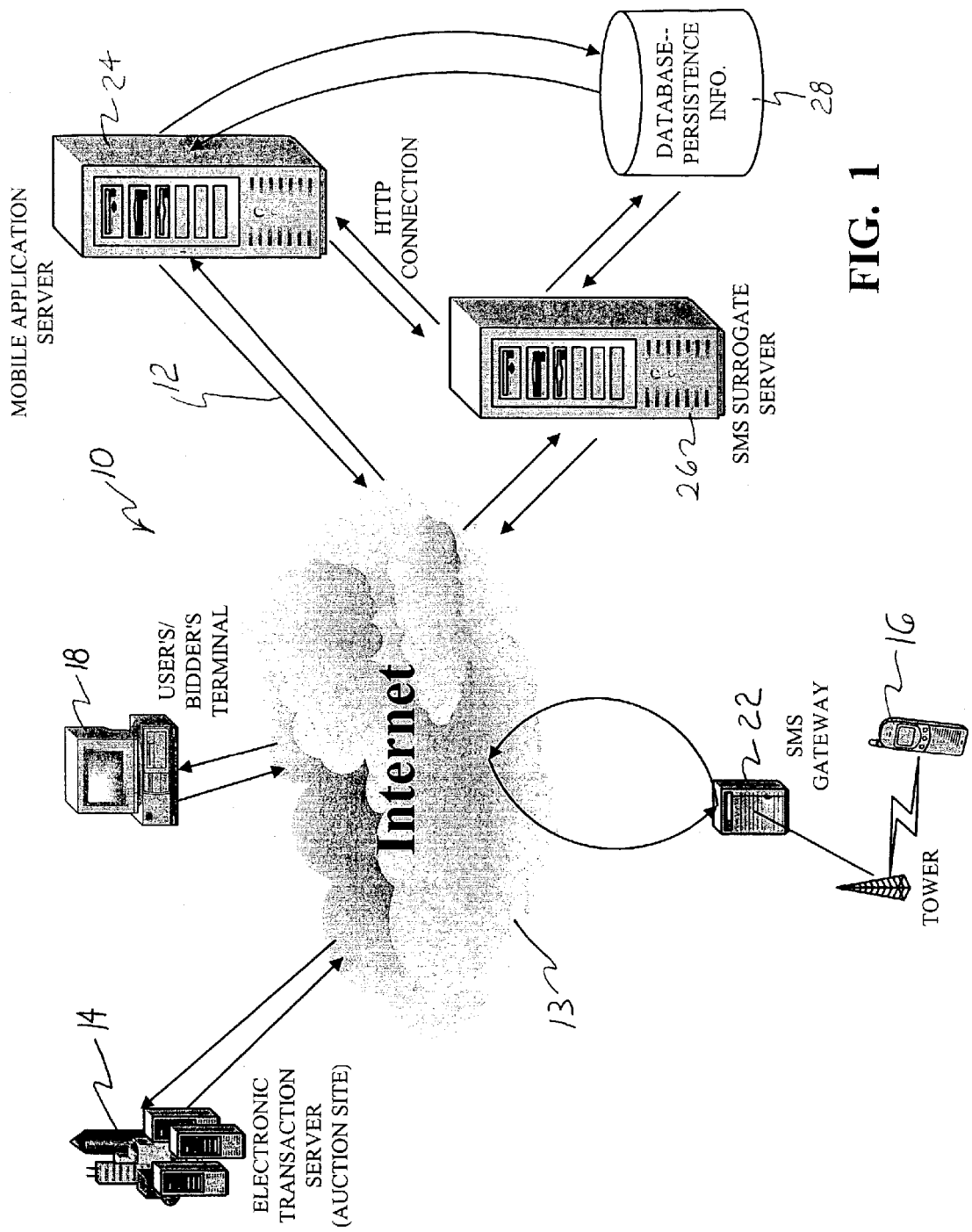
FIG. 1 is a schematic diagram showing a communications/computer network used to operate the SMS transaction system in accordance with the present invention.
Figure 2:
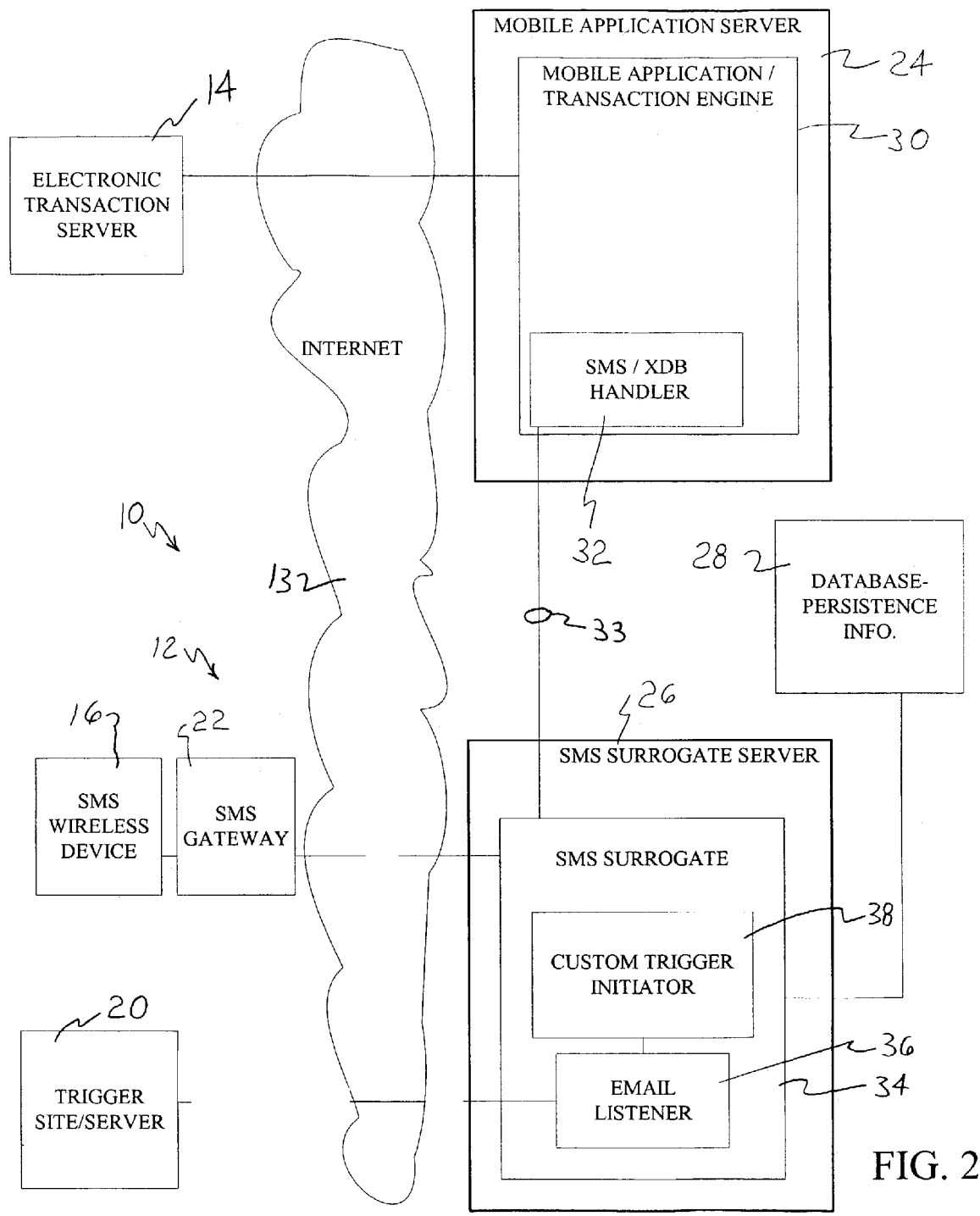
FIG. 2 is a block diagram of the network of the present invention.

Referring to FIGS. 1-2, an SMS transaction system generally indicated at 10 has a computer-communications network 12 such as a WAN, LAN or other computer network. Here, the network 12 preferably includes the Internet 13 which provides for communication between one or more electronic transaction sites or servers 14 (also called an external data provider as explained below) and SMS wireless devices 16, an exemplary one of which is shown.

The transaction server/site or external data provider 14 can be an internet service provider (ISP) or web site performing financial transactions or offering products for sale, for example, an auction web site/server (eBay®) or an event ticket sales web site. This server 14 may also simply be a repository of data that the SMS system 10 needs to process requests rather than the actual end-transaction server/auction site. For example, provider 14 can be a web service using XML dialog or a database that is accessed via an API/SDK. The hardware and software configurations for the transaction server/provider 14 are known and are not limited to any specific configuration.

The network may also include a user's or bidder's terminal 18 for a user of the SMS wireless device to initially register or offer initial bids on products for sale on the transaction server's web site. The terminal 18 can be any type of computer or known computer configuration that is fully Internet capable such that it can download and transmit data to other web site servers across the Internet.

The user preferably performs an activity on the transaction web site from the terminal 18, such as register, make an offer on a product for sale or on auction, or request monitoring of information on a transaction performed by the transaction server. This may include a request to notify the user when tickets of events are on sale and the price. The transaction server 14 may transmit messages to the user by email or XML message to provide the status information on a desired transaction. It will be appreciated that the user is not always required to register via a terminal 18 on the transaction server and that many other ways are known, such as by voice to voice, DTMF to computer, voice to computer, mailing a hard copy form, or any other way of providing profile and preference information. This registration would include the preference for receiving messages and transacting on an SMS wireless device 16.

The email messages transmitted from the transaction server 14 that provide updates or information on particular transactions may use "push" technology and are referred to herein as external push triggers or simply triggers. While the trigger can originate from the transaction server 14, FIG. 2 shows that the trigger can alternatively originate from a separate external data trigger source (trigger web site, database or server) 20.

The SMS wireless device 16 may be a cellular telephone with a display for showing the SMS messages and a keypad for entering alphanumeric characters on the display and transmitting the characters. The hardware and software configurations for such SMS devices are known.

SMS wireless devices 16 receive messages via an SMS gateway 22 and SMS center (which may actually be a part of the gateway) operated by a carrier such as AT&T WIRELESS®, NEXTEL®, VERIZON®, VOICESTREAM®, etc. The SMS center receives and stores SMS messages for forwarding to the SMS wireless device 16. The SMS device 16 has the ability to reply to these SMS messages by replying to the address in the FROM field in the received SMS message or other SMS address, and using the keypad to enter and transmit a body for the reply SMS message.

The network 12 also includes a mobile application server 24, an SMS surrogate server 26 and a database 28 to run the SMS transaction system. The servers 24, 26 can be general-purpose computers with a processor programmed to be a specific purpose computer. It will also be appreciated that the physical location of the servers 24, 26 and database 28 is not limited. Thus, while the servers 24, 26 are shown to be completely separate entities from the auction site 14, inherent in the invention is that the servers 24, 26 could also be a part of the auction site/server 14. At a minimum, an HTTP connection must exist between the servers 24, 26, and each server must have separate access to database 28.

The servers 24, 26 should be powerful enough to handle the community of users (i.e. the total number of users registered with the mobile application server 24). The pertinent number of users is the maximum number of simultaneous users at any given time. Generally, this number can be computed assuming a normal distribution of user accesses. The number of simultaneous "sessions" is usually less than 5% of the user community. This percentage sometimes drops to under 1% depending on day of the week, time of day, and when transactions typically start and end.

The servers 24, 26 preferably have at least 256 k of available memory per session and a processor which has at least the capabilities of an 800 MHz Pentium® processor. Required bandwidth between the wireless SMS phone 16 and the SMS surrogate server 26 is minimal compared to HTML browser based sessions (desktop). Each interaction between the phone 16 and the server 26 will typically involve 160 bytes of data. No strict requirements exist for the operating systems in general, although Windows 2000 has been found to be satisfactory.

The mobile application server 24 has a mobile application or transaction engine 30. The mobile application engine 30 runs in an XML dialect called GSML/GSIDL. The GSML portion of the mobile application 30 describes the user interface for web/internet enabled phones. It should be noted that the initials "GS" in any recited acronym hereinafter refer to the software designer company "GAD-GETSPACE™" unless explained otherwise.

The GSIDL portion of the mobile application 30 describes how to integrate with the transaction server or data provider 14. This integration can be accomplished via (1) interactions with an HTML web application, (2) interactions via an XML datafeed, or (3) interactions using APIs/SDKs. The GSIDL preferably uses the first method and permits the mobile application 30 to fully interact with an HTML web site (transaction server 14) to act on behalf of the user registered at that web site just as the user would from his terminal 24. For example, when the mobile application receives a new bid value from a users wireless device (stored at database 28), it can enter that bid in a virtual auction held by the transaction server 14.

The mobile application engine 30 may have a number of handlers that understand how to interact with on-line mobile devices such as WAP technology based phones or wirelessly enabled PDAs. In the illustrated embodiment of the invention, the mobile application 30 has at least a SMS or XDB handler 32. In contrast to the handlers that are directly connected to internet-enabled wireless devices, the SMS or XDB handler 32 is not directly linked to any wireless device. Instead, the handler 32 is a software module that stores and retrieves transaction persistence information at the database 28 and transmits XML messages to the SMS surrogate server 26 to provide a transaction ID number to the surrogate server 26. The surrogate server 26 has a SMS surrogate application 34 that receives and transmits SMS messages from/to SMS devices 16, receives email messages from users and the trigger site or source 20, and receives XML messages also from the trigger source as well as from the mobile application server 24. The SMS surrogate 34 also looks up and reads tables on database 28 and transmits URL-HTTP queries to the handler 32. In order to be able to parse information from email triggers, the surrogate 34 has an email listener 36 and a custom trigger initiator 38 that provides instructions for parsing information from emails from particular trigger sources 20.

With this configuration, it is possible to conduct a transaction with two-way communication between an SMS wireless device 16 and an internet web site transaction server or data provider 14 that is "online." This is possible due to the two-part surrogate-mobile application/handler design. The SMS surrogate 34 communicates with an SMS wireless device 16 using SMS messages to obtain input data required to perform a transaction. That input data is forwarded to the handler 32 that stores the input data in the database 28. Once stored, the mobile application 30 can run an online session with the transaction server or external data provider 14 (auction site/sales web site) by having all the required data for the transaction placed in the temporary memory of the mobile application server 24. Thus, the mobile application server 24 acts on behalf of the SMS user in an online transaction even though the user communicates with disjoint, offline SMS messages.

As a preliminary step in the process for operating the SMS transaction system process, in most cases a user will register with the SMS transaction system either directly with the mobile application server 24 or indirectly at the transaction server 14 which then forwards the registration data to the application server. The application server 14 will build and store a user profile either on database 28 or another database (not shown) for this purpose. The profile records will contain enough data to identify the user, the transaction server 14 used by the user, and the parameters and requirements of the user's wireless device 16.

Figure 4A:
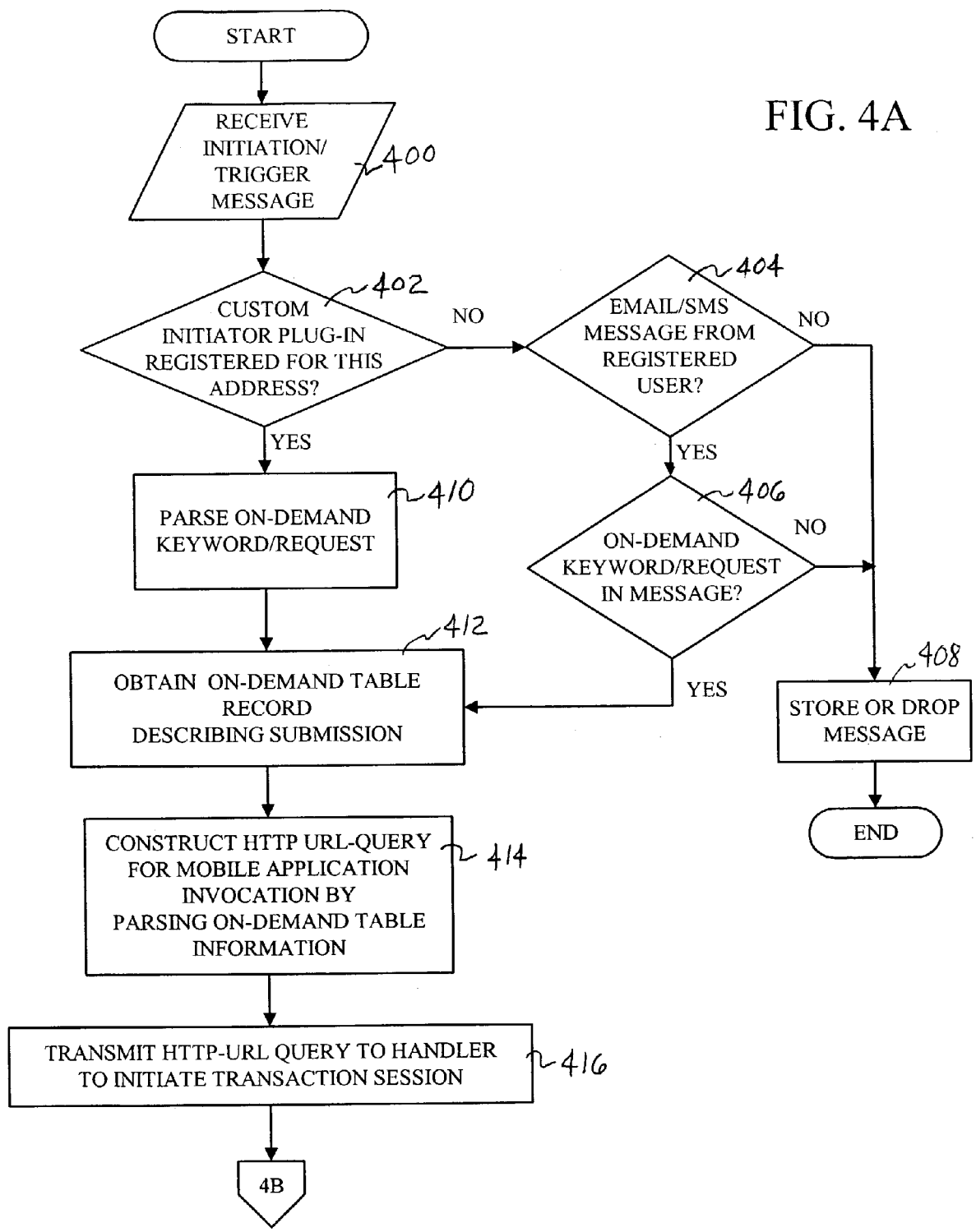
FIGS. 4A-4E is a detailed flow chart for explaining the method for operating the system of the present invention.

The general process for operating the SMS transaction system 10 is shown on FIG. 3 and the details of the process steps are shown on FIGS. 4A-4E. Referring to FIGS. 3 and 4A, for the SMS transaction system 10, a transaction is initiated either with an "on-demand" request from the SMS client, or more regularly, with a push message from a service provider such as the trigger server/site 20 or transaction server/site 14. The push trigger message can be an email message from an auction provider informing that the user has been outbid, or the push message could be a custom XML data push from a ticket provider, for instance, that wants to create a transaction to sell concert tickets. In other alternatives, the messages can be automatic status checks issued at certain time intervals, or regarding changes to task lists relating to any sort of task that the mobile application could perform for the SMS client. The client SMS (or email) messages are unsolicited requests for information or to perform a certain transaction. No matter the format of the initiation message for an SMS device, it is first received by the SMS surrogate 34 (step 300, 400).

Once the surrogate 34 receives a trigger message, it gathers all information from an SMS client/device 16 necessary for the mobile application 30 to perform a requested transaction with the transaction server 14. This typically includes data, including hidden data, that would normally be needed to fill fields on web site, Internet or other computer type forms to perform a transaction online.

If the trigger message is an email message, it is received by the email listener 36. The email listener 36 looks at the email address and determines if it is an address registered with the custom trigger initiator 38 (step 402). For example, the email listener will know to forward any message from mobilenum@auctionrebid.net to trigger initiator 38 which is the email from the auction provider named "rebid." If the trigger message is an externally initiated XML message rather than one from the handler 32, it is immediately forwarded to the trigger initiator 38.

The trigger initiator 38 has plug-ins to read the push trigger messages which have formats that are very specific to a service provider 14, 20. The trigger initiator 38 uses the plug-in to understand the data format the service provider 14, 20 is sending to it and to extract/parse the "request" name listed on "on-demand" tables 500, 502 (FIGS. 5A-5B). The request name refers to an action that the mobile application can perform for the SMS client. Here, the on-demand tables lists three possible actions: (1) "tasks"—reviewing and providing instructions to perform a list of tasks (i.e. a list of operations that the mobile application can perform), (2) "email"—permitting the SMS client to view messages in their inbox, and (3) "rebid"—place a bid in an auction. It will be appreciated that this is only an example and many other types of requests/actions are possible. The trigger initiator 38 or surrogate 34 looks up the request names on the on-demand table to see if there is any match (step 410).

If the trigger message is an SMS message, or email message not registered with the trigger initiator 38, the surrogate determines if the message was sent from an SMS client (step 404). If it is, the SMS message is also searched to find the on-demand keyword or request name that matches the requests listed on the on-demand tables 500, 502 (step 406). If the message is not from an SMS client or it does not include an on-demand keyword, the message is either dropped or stored, and the processing of this message is stopped (step 408).

Once the surrogate 34 determines that the trigger message or client on-demand message includes a request named on the on-demand tables 500, 502, it retrieves the on-demand table 500 record for the matching request (step 302, 412). The record for each request includes a data field for a URL to communicate with the handler 32, a ScenarioName which is the name of the application or module itself run by the mobile application 30, a Startpage which is the name of the HTML web page of the service/external data provider/transaction server 14 that is to be transacted with, and UserIDRequired fields (i.e. yes/no or 1/0 field). The autologin field of the on-demand table 500 indicates if the user information can be obtained from the profile database (not shown). This profile will also include a userID that is matched to the data sent in the trigger messages or the SMS client message.

The surrogate 34 also looks up the on-demand details table 502 to determine if any additional information is needed. For the request "tasks" no other data exists and therefore no on-demand details table exists for this request. Upon obtaining this data, the surrogate 38 creates a request to invoke a transaction session in the form of an HTTP-URL query to transmit to the handler 32 (step 414). In this case, the address for user ID 134 would be:

"http://localhost/ipmg/
RS7?Gssid=TaskList&GSpn=Start&Gsuid=134."

In another example where the request "rebid" is chosen, the on-demand detail table 502 shows that a username, password and auctionID is also needed. The auction ID is preferably either the trigger email address name (e.g. "mobilenum" shown above) or is stored on the user's profile that is accessible to the surrogate 34. For user ID 134, the request may look like:

"http://localhost/ipmg/
RS7?Gssid=Rebid&GSpn=Outbid&GSUN=
<profileusername>&GSPW=<profilepassword>&
AuctionID=<mobilenum>&Gsuid=134."

Once formed, the HTTP requests are transmitted to the handler 32 (step 304, 416). In the preferred embodiment, this is an internal line 33 directly connecting the surrogate server 26 with the mobile application server 24. It will be appreciated, however, that this line could simply be connected to the Internet 13.

Figure 4B:
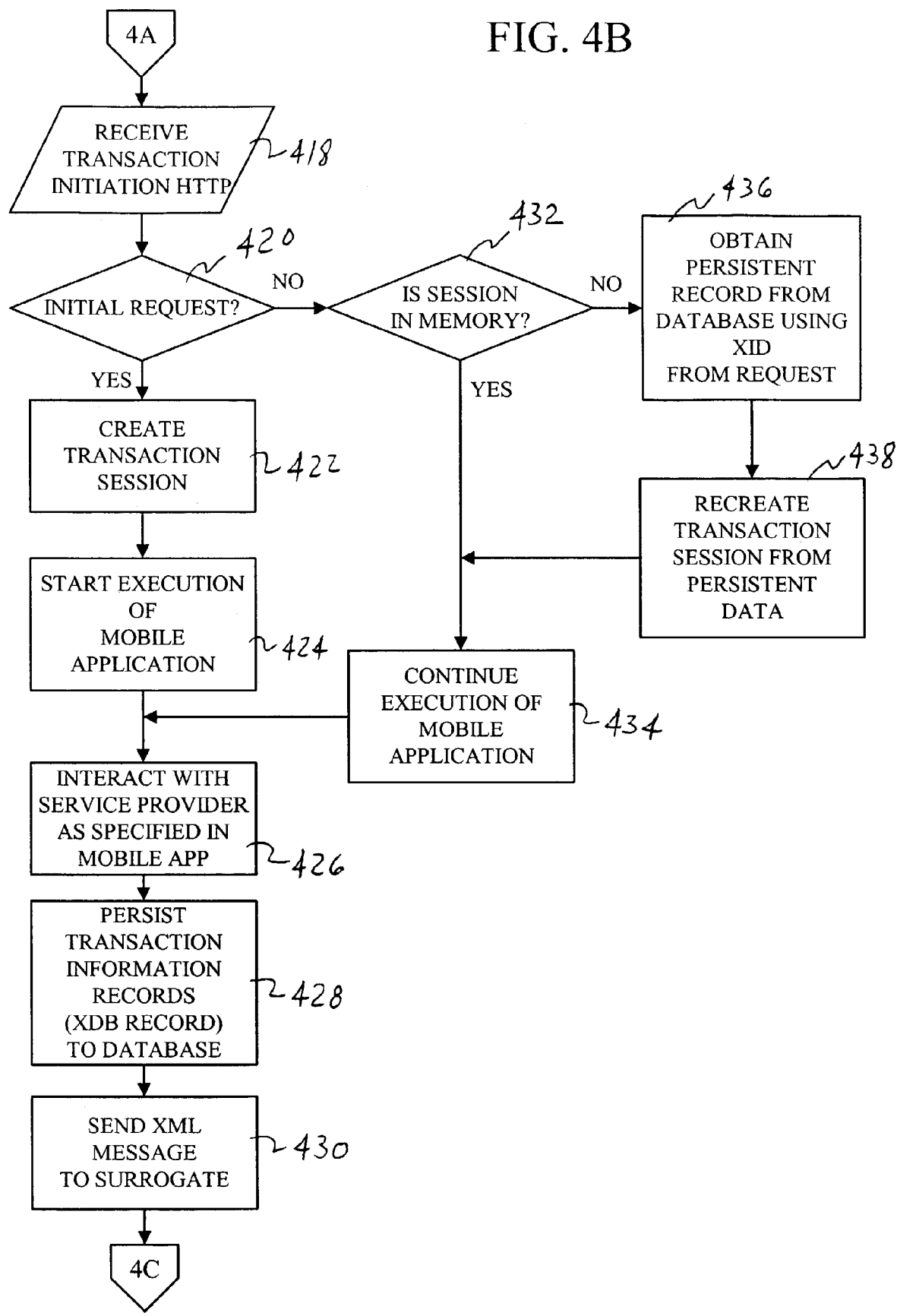

Referring to FIGS. 3 and 4B, once the handler 32 receives the HTTP invocation request (step 418), the handler forwards the message to the mobile application/transaction engine 30, which then checks to see if the request is an initial request or a request for a continued transaction (step 420). If this is an initial request, the application engine 30 creates a new application session and generates a unique persistence transaction ID (hereinafter the XID) to be used to identify all fields in database 28 related to the current request/transaction (step 305, 422). A new XID is generated every time new data records for a table are stored on database 28. The application server 24 then runs the appropriate mobile modules/applications 30 for that request (Step 424). This includes retrieving the GSML/GSIDL and processing the appropriate startpage for that request listed on the on-demand table 500. The Startpage is the mobile application's representation (i.e. the list of data it needs to acquire) of the first online/internet form that needs to be filled in for a certain transaction with a specific transaction site 14, 20. For example, the startpage "start" for the request "tasks" consists of a login screen requesting a username and a pin.

The mobile application 30 interacts with the external data provider (transaction server) 14, 20 to determine what information is needed to populate the required forms and what information is already present in the user's profile (step 426). Once this data is obtained by the mobile application 30 it forwards it to the handler 32, which creates new records and stores the information on transaction tables 504, 506 for example on the persistence transaction data database 28 (step 428). This data is "persistent" because it will stay in permanent memory no matter how much time elapses from when the SMS surrogate sends a request for information to the SMS user's wireless device 16 and the time the SMS user responds. It will be understood that anywhere hereafter where it is discussed that new tables are formed, this more accurately refers to new data and new records that are placed on a table. A new table is only "truly" formed the first time it is established.

The transactions table 504 includes fields for the invariant information needed to process the transaction XID and to form the SMS to the wireless device 16 including the UserID, the Subject for the Message, the Initial Body of the message, the response URL, and session ID of the running session. The TransactionsDetail Table 506 includes fields for the additional information that must be obtained by the SMS surrogate 34 to complete the required forms and perform the requested transaction. Permitted data for these fields are located in the VALUE fields. In the VALUE column, there are prepopulated values, as well as null values. The null values must be populated by the SMS surrogate 34 via a dialog with the SMS client's wireless device 16.

More specifically, on the Transactions Detail table 506, ENUM refers to an enumeration ID for choice or option type elements where the SMS user must decide among a number of choices or options, PROMPT refers to the prompt to be displayed in an SMS message (preferably after the "BODY" as recited in the transaction table) to the user, NAME is the type of field variable to be returned to the XDB Handler (e.g. username, password, session ID, pin number, etc.), VALUE as mentioned above is the value to be returned to the XDB Handler, also used as working storage by the SMS surrogate, and TYPE is the type of field variable to be returned to the XDB Handler by the SMS surrogate.

Once the XID and transaction tables 504, 506 are established (or more accurately once new records are stored on the tables) (step 306, 428), the XDB handler 32 sends an XML message containing the XID, for example "12345" to the SMS surrogate 34 (step 307, 430).

Figure 4C:
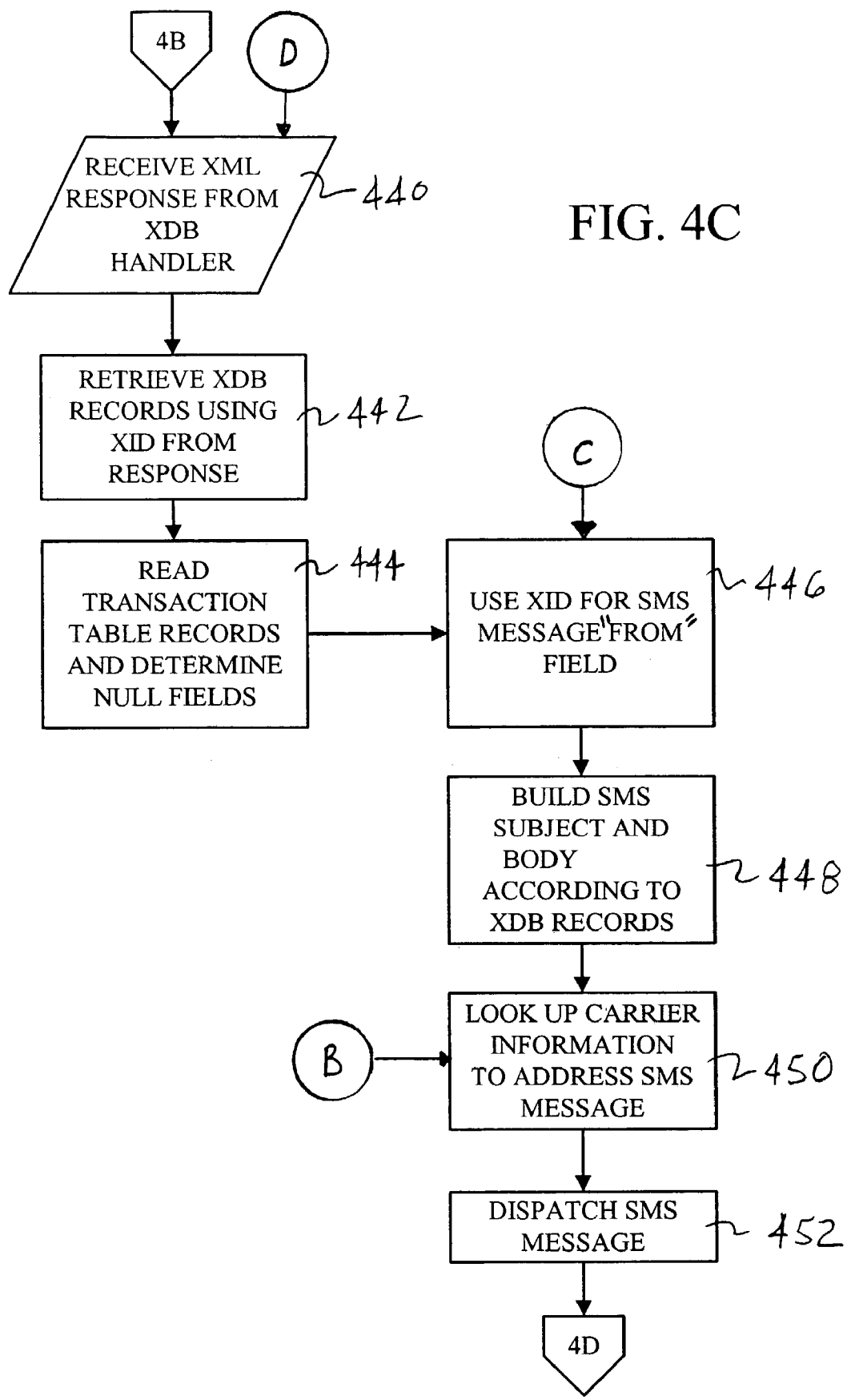

Referring to FIGS. 3 and 4C, upon receiving the XID (step 440), the surrogate 34 looks up the XID in the database 28 to find the corresponding transaction tables 504, 506 and retrieves the records on those transaction tables (step 442).

Next, the surrogate 34 reads the records and determines which fields are null on the transaction details table 506 and need to be populated by answers from the SMS client's wireless device 16 (444).

The XID is parsed from the XML message from the handler 32 and is used as the "FROM" address for the SMS message to the wireless device 16 (step 446). The address is <XID>@sms.net where sms.net is a sample domain name, and the XID is always parsed from the "FROM" address which the SMS client will reply to. This maintains a tag to the correct transaction on all SMS responses to the SMS surrogate 34.

The SMS message preferably prompts for one input field, or one set of choices (selections/options) at a time in order to ensure the message stays within the SMS message length limits and ideally avoids time and dropping of message text by an SMS center that parses the message. This is described as a "step-wise" or a multi-step process where the time between the steps to obtain each input is arbitrary as explained further below.

An SMS message is then built based on the transaction table 504 data requesting the information for the first NULL field on the transaction details table 506 (step 308, 448). For example, for the first SMS message relating to tables 504, 506, the subject is "Task List Login" and the body/prompt is "Login Username". For an auction, the body/prompt might be "You have been outbid. The new high bid is $XX.XX. Your new bid:".

The surrogate 34 then looks up the carrier information on a profile database (not shown) for instance (step 450), and dispatches the SMS message (step 310, 452).

Figure 4D:
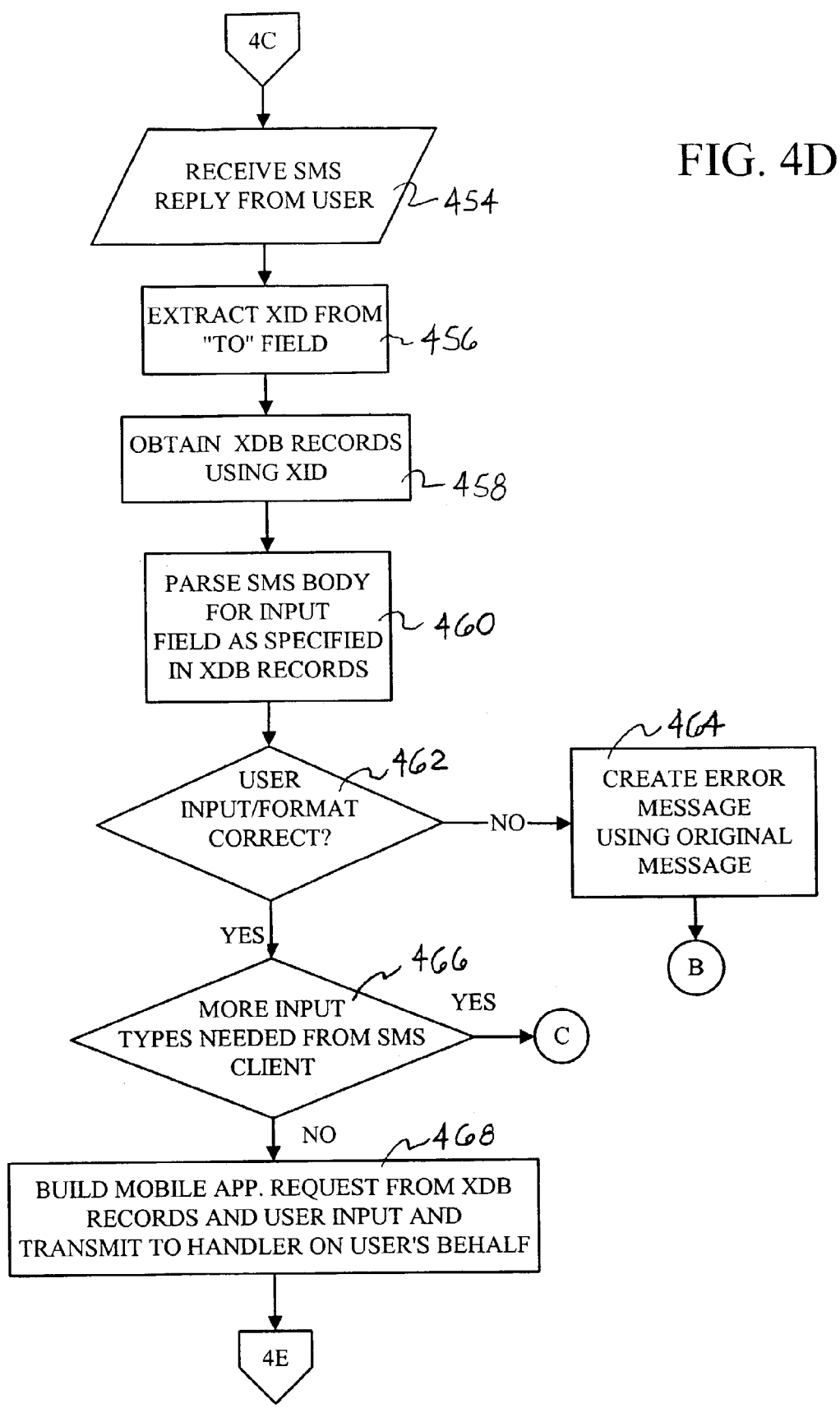
Figure 4E:
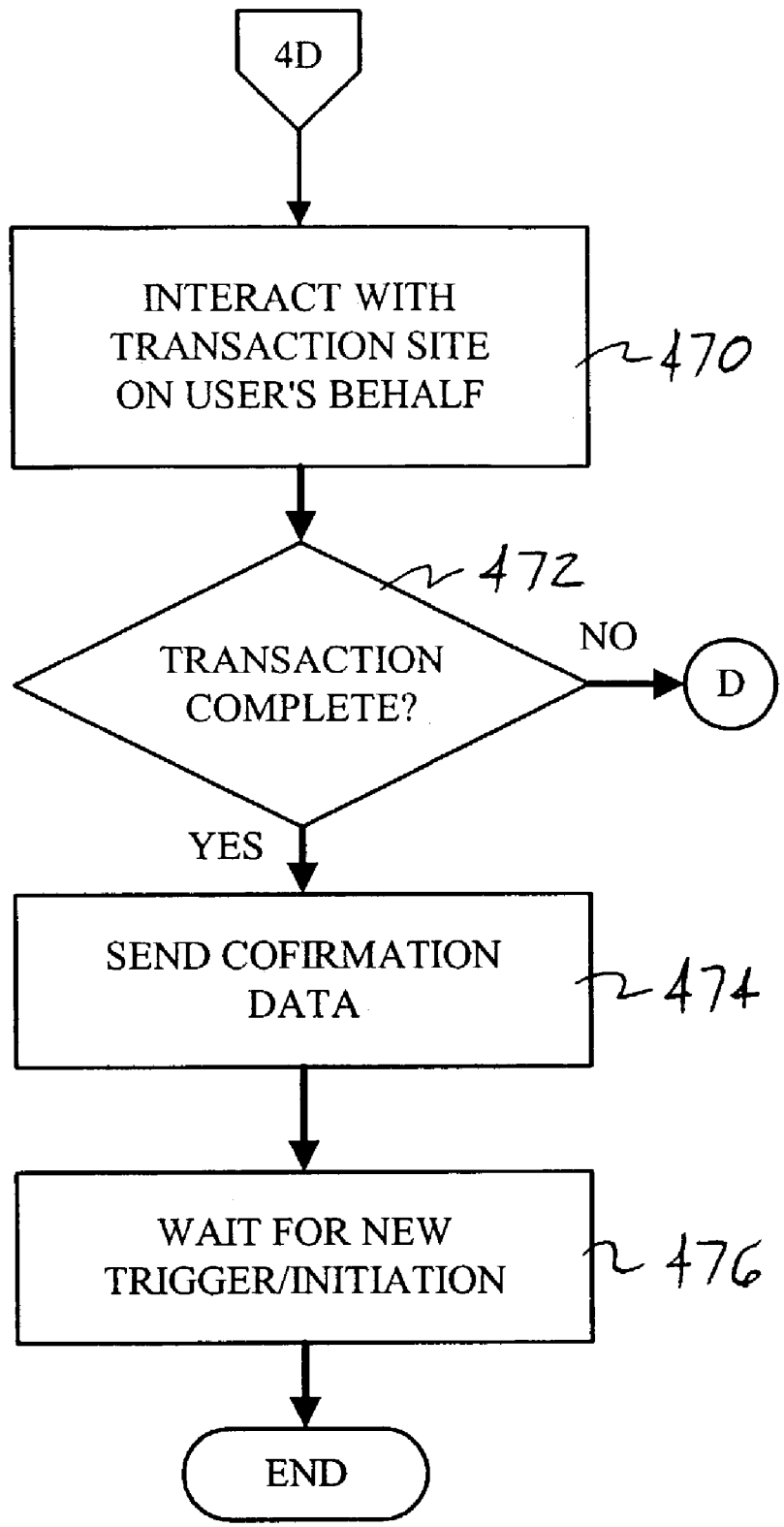

Referring to FIGS. 3 and 4D, the SMS user replies to the SMS message from the SMS wireless device 16 by answering the prompt with the requested information or input data (step 312, 454). This response is free form (a combination of alphanumeric characters) or a number corresponding to a list of enumerated choices provided to the SMS device 16 in the SMS message from the surrogate 34. The format of the response, however, is preferably in a certain format which is explained to the user when the user registers with the SMS transaction system 10. For instance, the required format for an answer to an SMS message may be "<mobile passcode><space><response value>" where the passcode is a password or pin number.

Next, the SMS surrogate 34 parses the XID from the "TO" field of the response SMS message (step 456), and obtains the XDB or transaction table records corresponding to that XID number (step 458). The body of the SMS response message is parsed for the input data (also referred to as the "name-value pair") as specified by the transaction records (step 460).

Once the data is obtained, gross level validation is performed to determine if the received name-value pair has the expected format and values (step 462). If an error is detected, an error SMS message is created using as much of the original SMS message sent to the SMS device 16 as will fit within the SMS character limitation (Step 464). Then, the process for transmitting the SMS message is carried out again (steps 450, 452) and the surrogate waits for a new response from the SMS device 16.

If no error occurs, the surrogate 34 places the data into the database record, and then determines if there are any other NULL fields in the transaction detail table 506 that needs to be filled (step 314, 466). As shown on table 506, the next input data that is needed is the PIN. The steps for creating and transmitting a new SMS message to the SMS device 16 (steps 446, 448, 450 and 452 on FIG. 4C) are repeated to obtain the PIN. Since the SMS surrogate retrieves the input data by breaking down the retrieval process into separate transmissions, no time limit exists for obtaining the data that is controlled by necessity for an "active" online session. It will be appreciated, however, that the SMS transaction system may have self-imposed time limits for waiting for a response from an SMS user until the records on the transaction tables are deleted.

When no more NULL fields exist in the transaction detail database, the surrogate 34 builds a mobile application "scenario request" in the form of an HTTP URL query that includes the input data (static name-value pairs) received from the SMS wireless device 16 (step 468) and the values already in place on the transaction detail table 506. For tables 504, 506, the following scenario request would be formed:

"http://localhost/ipmg/RS7;
Jsessionid=6D128573i?GSUN=<usernamevalue>&
GSPW=<pinvalue>&Gssid=7&GSpn=Done&Button=
OK&Type=submin&Gsuid=134"

This request is then submitted to the handler 32 (step 316, 468), which provides it to the mobile application 30 for processing and submission of a completed form to the transaction server 14. The mobile application interacts with the external data provider or transaction server 14 by forming, an HTTP transmission on behalf of the user to the transaction site/server 14 (step 318, 470). It will be appreciated, however, that any of the GSIDL communication or similar online communication methods mentioned above can be used for the mobile application 30 to act on behalf of the SMS client.

It is then determined whether or not the transaction is complete or further data is still needed (step 320, 472). If the transaction is complete, the external data provider 14 provides the mobile application with confirmation data that can be forwarded to the SMS client through the surrogate 34 (step 474), and the SMS system waits for the next trigger or initiation event (step 322, 476).

If the transaction is not complete, however, the external data provider 14 provides the mobile application with data for establishing further new records on the transaction tables for obtaining further input data from the SMS client. This may simply be a table for the next menu required for the transaction where, for example, the first transaction tables 504, 506 merely provided data for a login screen and new transaction data tables 508, 510 (FIGS. 5E-5F) are needed to obtain further decisions or "options" from the SMS user.

In order to obtain the input data for new records on transaction detail table 510, the process returns to step 440 (and 306 on FIG. 3) and the same XID number is provided in an XML message to the surrogate 34 as long as the session is still in the short term memory of the mobile application 30 as explained below. The XML message indicates to the surrogate that new records have been stored in transaction table(s) and more data needs to be obtained.

Referring again to FIG. 4A, if the mobile application 30 determines that a request to initiate a session is for a continued transaction (Step 420), the mobile application/handler determines if the session is still in short-term memory of the mobile application server (step 432). If the session is still active in memory due to the user responding shortly after the SMS message was sent out for example, that session continues with the execution of the mobile application 30 (step 434).

If the session is no longer active because the user responded a long time after the SMS message was sent or the mobile application server 24 was rebooted, for example, then a new session will be created with a new XID number from the persistence information/data in the database (step 436), and the transaction sessions is recreated with the new XID number (step 438).

Referring to FIGS. 5E-5F, an example is provided for showing a new session that is created for a second set of transaction tables 508, 510 after the SMS client has already provided information for the first login transaction tables 504, 506. This is the next page for the mobile task list scenario and provides for two choices named "New Tasks" and "Close tasks". Because this session was not in memory, a new XID number (here 12346) is created and transmitted to the surrogate to be processed as shown on FIGS. 3 and 4A-4E. Because these tables require a choice or option from the SMS client it is called an enumeration request. The SMS message created by the surrogate 34, as can be seen from the data listed on the tables 508, 510, will have a body asking the SMS client to choose a number for each choice provided e.g. "(1) for New Task, (2) for Close Task". Upon receiving the response from the SMS client, the surrogate 34 would combine the new input data with the data on the transaction tables 508, 510 to form the request to the handler 32. The SMS HTTP URL query reporting the user's preference would look like:

"http://localhost/ipmg/RS7;
Jsessionid=6D128573iDisplay=0&Gssid=7&GSpn=
OpenTasks&Gsuid=134."

The process continues on as recited in FIGS. 3-4 for the SMS transaction system.

Referring to FIGS. 5G-5H, transaction table 512 and transaction detail table 514 are provided to show example data that would be used to form an SMS message only to display information on the SMS wireless device 16. This message does not need a response, and therefore does not list a URL for response. The transaction detail table 514 is in fact empty. This is the type of table and response that could be provided for a transaction confirmation message.

The advantages of the present invention are now apparent. An SMS transaction server 10 has a mobile application 30 that has an SMS or XDB handler that receives SMS messages from an SMS wireless device 16 via an SMS surrogate 34. The XDB handler stores data for tables on a database 28 which the surrogate 34 has read and write access to. The SMS surrogate 34 can obtain input data needed to perform a transaction from the SMS devices 16 using the disjoint non-continuous communication of SMS messages. Once all data for a particular form, data query or transaction is obtained, the data is made available for the mobile application to maintain an active-online session with an external data provider or transaction server/site 14.

While various embodiments of the present invention have been described, it should be understood that other modifications and alternatives can be made without departing from the spirit and scope of the invention, which should be determined from the appended claims.

We claim:

1. A system for performing transactions between a short message service enabled wireless device and transaction server on a computer network performing financial transactions, comprising:

an application server interacting with said transaction server;

a database for storing at least ongoing transaction information;

an SMS surrogate configured for submitting a transaction request on behalf of a user of said wireless device to said application server for ultimate transmission to said transaction server, and for creating an SMS message for transmission to said wireless device and corresponding to a transaction information message received from said application server, said application server interacting with said wireless device and having an SMS handler for creating said transaction information message for transmission to said SMS surrogate and based on information received from said transaction server, and for forming database entries for storing information regarding a transaction in said database, wherein transaction option(s) are displayed on said wireless device and indication of a chosen option is transmitted back to said SMS surrogate for conducting a financial transaction with said transaction server.

2. The system of claim 1, further comprising a push trigger initiator for receiving a message in either XML or email format including information to initiate a transaction, and for sending a transmission to said SMS handler.

3. An SMS transaction system, comprising:

an application server having an application with a handler, said application having active online sessions for performing a transaction;

an SMS surrogate communicating with at least one SMS wireless device by transmitting and receiving SMS messages including an original SMS message transmitted from said SMS surrogate to said SMS wireless device and a reply SMS message from said SMS wireless device to said SMS surrogate, said original SMS message including a request for transaction user data, and said reply SMS message including said transaction user data, said SMS surrogate transmitting an HTTP-URL query communications including said transaction user data to said handler; and a database accessible by said application, said handler and said SMS surrogate for storing and retrieving said transaction user data from said database, wherein said transaction is performed online by said application on behalf of said user by obtaining said transaction user data from said database.

4. The system of claim 3, wherein said transaction receives a transaction ID number, said transaction ID number being used in a SMS message address field of said SMS messages as an address for said SMS surrogate.

5. The system of claim 1, wherein said database has tables including data to be placed in said original message that indicates to a user that receives said original SMS message on said SMS wireless device that a response must include specific type of information.

6. A short message transaction system, comprising:

a computer that communicates in an online internet protocol that forms active sessions;

a wireless device that communicates in a protocol that transmits and receives messages that have a maximum size limit of a predetermined number of alphanumeric characters smaller than a number of alphanumeric characters transmitted in a communication of said computer;

a database; and a surrogate that communicates with said wireless device and said computer, said surrogate collecting data from a plurality of messages from said wireless device and providing said data for storage in said database, wherein said computer runs online sessions with said stored data.

7. The system of claim 6, wherein said computer protocol is hypertext transfer protocol.

8. The system of claim 6, wherein said wireless device protocol is short message service (SMS).

9. The system of claim 6, wherein said computer has an application for performing said active session, said application having a handler for storing said data in said database and for receiving said data from said surrogate in the form of an http protocol message.

10. A method of transacting with an online transaction server from an SMS wireless device, comprising the steps of:

receiving a request to perform an online transaction;

determining what data is needed from a user of an SMS wireless device;

transmitting original SMS messages to said SMS wireless device requesting missing data;

receiving reply SMS messages from said SMS wireless device including said missing data;

forwarding said missing data to a computer having an application that conducts online transactions;

storing said missing data in a database; and performing an online transaction using said missing data.

11. The method of claim 10, when said transmitting SMS messages further includes the steps of:

transmitting a plurality of original SMS messages to said SMS wireless device, each said original SMS message requesting less than all of a plurality of missing elements that make up said missing data, and collecting missing elements obtained from a plurality of said reply SMS messages to form a single communication to provide said missing data to a computer that performs said online transactions.

12. The method of claim 11, wherein said single message is in the form of an HTTP communication.

13. The method of claim 10, wherein a computer performs said online transaction after all reply SMS messages for a particular transaction provide all missing data necessary for said transaction, and wherein the time it takes for said user with said SMS wireless device to reply to said original SMS messages is received on said SMS wireless device does not affect the computer's ability to maintain an online communication for said online transaction.

14. A short message surrogate, comprising:

means for receiving text messages from users' wireless devices communicating with short text messages limited to a certain number of alphanumeric characters per message;

means for collecting data from a plurality of said short messages;

means for forming a single HTTP message that includes said data from said plurality of said short messages; and means for transmitting said HTTP to a computer that communicates on online active sessions, wherein said computer performs said online active sessions on behalf of said user by using said data.

* * * * *